United States Patent
Kuang

(10) Patent No.: US 6,556,528 B1
(45) Date of Patent: Apr. 29, 2003

(54) FIXING DEVICE FOR DATA STORAGE DEVICE OF COMPUTER

(75) Inventor: Yen Kuang, Taipei (TW)

(73) Assignee: Inventec Corporation, Taipei (TW)

( * ) Notice: Subject to any disclaimer, the term of this patent is extended or adjusted under 35 U.S.C. 154(b) by 146 days.

(21) Appl. No.: 09/631,997

(22) Filed: Aug. 3, 2000

(51) Int. Cl.$^7$ .............................. H05K 5/00; G06F 1/16
(52) U.S. Cl. ..................................... 369/75.1
(58) Field of Search .................... 312/108, 257.1, 312/258, 223.2; 369/75.1; 361/685, 683, 684, 819, 394; 248/220.22, 615; 360/137, 97.01; 348/615

(56) References Cited

U.S. PATENT DOCUMENTS

| | | | |
|---|---|---|---|
| 5,142,447 A | * 8/1992 | Cooke et al. | 361/394 |
| 5,301,088 A | * 4/1994 | Liu | 248/27.3 |
| 5,398,157 A | * 3/1995 | Paul | 248/221.11 |
| 5,438,476 A | * 8/1995 | Steffes | 312/223.2 |
| 5,488,538 A | * 1/1996 | Wakita | 361/685 |
| 5,564,804 A | * 10/1996 | Gonzalez et al. | 312/223.2 |
| 5,680,293 A | * 10/1997 | McAnally et al. | 361/685 |
| 5,788,211 A | * 8/1998 | Astier | 248/674 |
| 5,940,265 A | * 8/1999 | Ho | 312/223.2 |
| 6,058,008 A | * 5/2000 | Chen et al. | 361/685 |

* cited by examiner

Primary Examiner—William Korzuch
Assistant Examiner—Christopher R. Beacham
(74) Attorney, Agent, or Firm—Birch, Stewart, Kolasch & Birch, LLP

(57) ABSTRACT

The present invention provides a device for fixing a data storage device, such as hard disk or CD-ROM drive, to a case of computer. The device includes at least a positioning pin formed on a vertical surface located aside a space to hold the data storage device; a base, horizontally extended from the vertical surface, for carrying the data storage device; and a vertical plate, parallel to the vertical surface and fixed on the base, for seizing the data storage device between the vertical surface and the vertical plate. The vertical plate is also formed with at least a positioning pin to pass through at least a screw hole of the data storage device and hold the data storage device in place. A screw can further be used on the vertical plate to fasten the data storage device. Or, the vertical plate and the data storage device can be pressed and fixed by a computer case or another adjacent element.

16 Claims, 4 Drawing Sheets

FIXING DEVICE FOR DATA STORAGE DEVICE OF COMPUTER

BACKGROUND OF THE INVENTION

1. Field of Invention

The present invention relates to a device for fixing a data storage device, such as a magnetic or an optical disc driver, of a computer, and more particularly relates to a device for fixing a data storage device by which the storage device can be easily fixed and removed.

2. Related Art disc In the structure of a computer, a plenty of devices, such as hard disc drivers, optical disc drivers or floppy disc drivers, are incorporated in a limited space. These data storage devices are generally installed by screws fastening through the frame of computer to the sides of the devices. Screws and tools are therefore needed for the assembly and disassembly which cost more time and money. Those small screws are also easy to lose and cause inconvenience.

SUMMARY OF THE INVENTION

It is therefore an object of the present invention to provide a device for fixing a data storage device, such as a magnetic or an optical disc driver, of a computer. The fixing device uses only a screw or even no screw to fix the data storage device, so that it costs less time and operation to install and remove the data storage device. To achieve the aforesaid object, a device for fixing a data storage device of a computer according to the present invention includes: at least a positioning pin formed on a vertical surface located aside a space to hold the data storage device; a base, horizontally extended from the vertical surface, for carrying the data storage device; and a vertical plate, parallel to the vertical surface and fixed on the base, for seizing the data storage device between the vertical surface and the vertical plate. The vertical plate is also formed with at least a positioning pin to pass through at least a screw hole of the data storage device and hold the data storage device in place. A screw can further be used on the vertical plate to fasten the data storage device. Or, the vertical plate and the data storage device can be pressed and fixed by a computer case or another adjacent element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
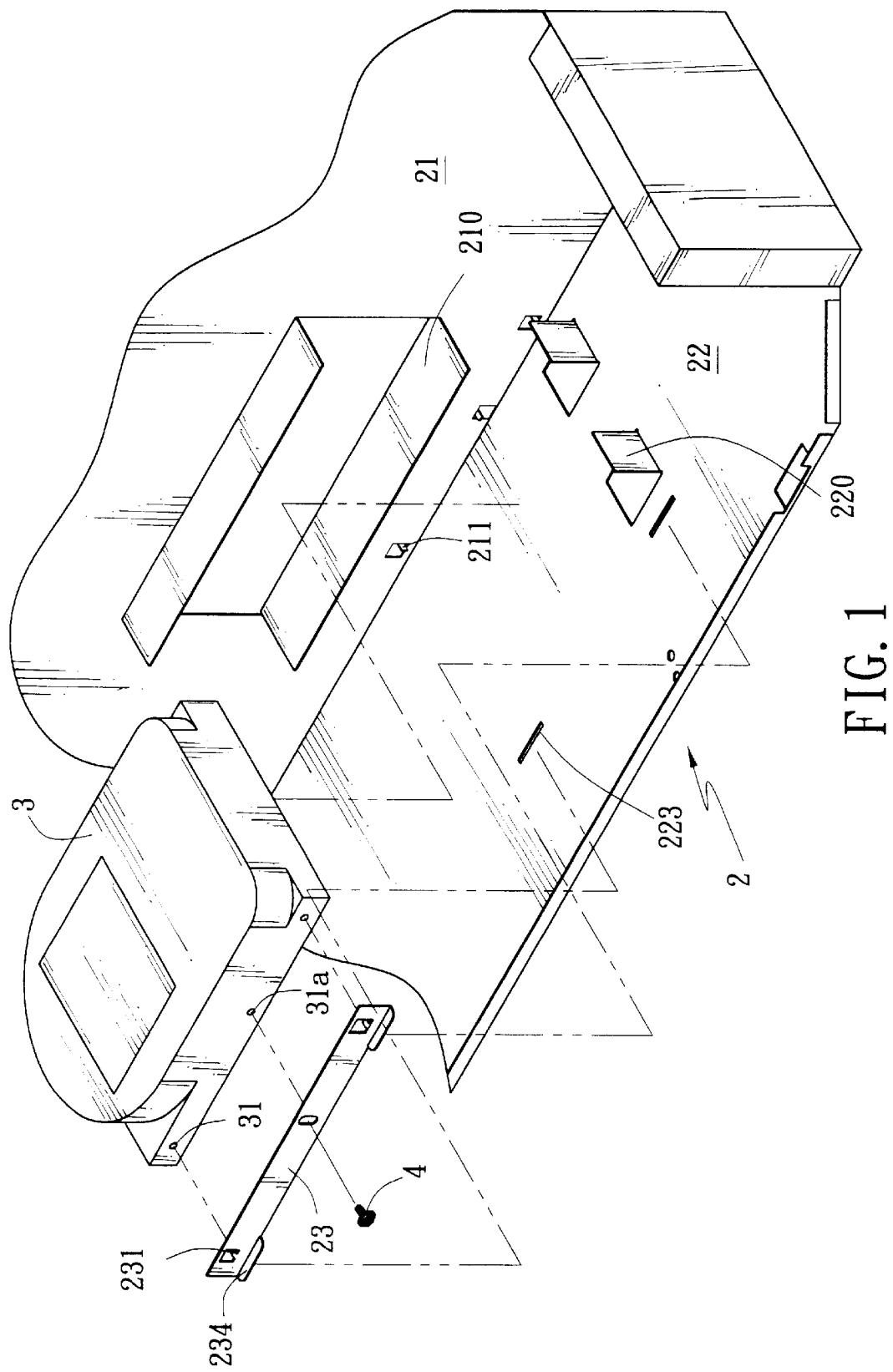
FIG. 1 is an exploded view of a fixing device for a data storage device of computer according to the present invention.
Figure 2A:
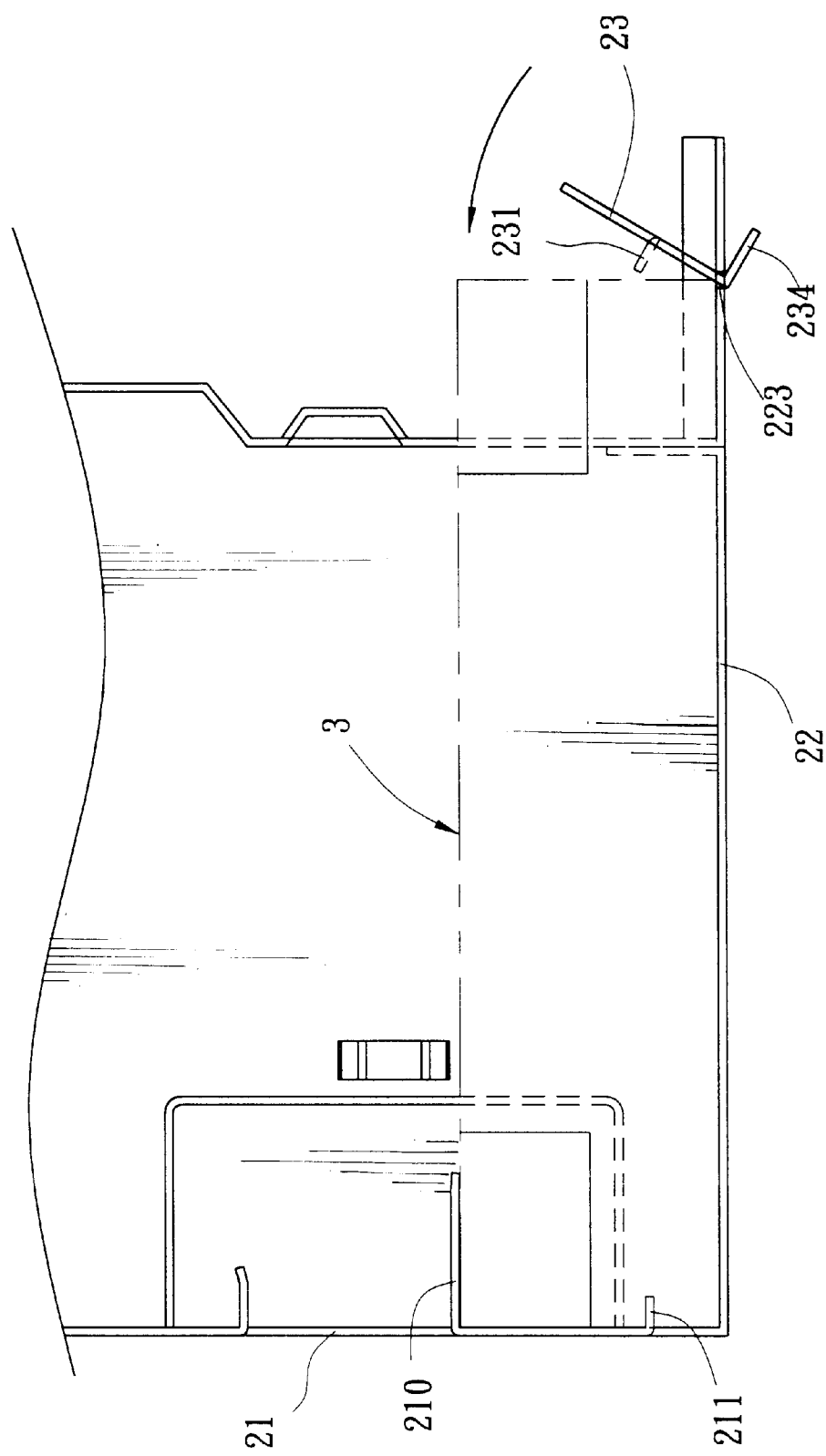
FIG. 2A is a sectional view of the structure of FIG. 1, showing a vertical plate being mounted.

As shown in FIGS. 1 and 2A, a device for fixing a data storage device 3 of a computer according to the present invention includes: at least a positioning pin 211 formed on a vertical surface 21 located aside a space 2 to hold the data storage device 3; a base 22, horizontally extended from the vertical surface 21, for carrying the data storage device 3; and a vertical plate 23, parallel to the vertical surface 21 and fixed on the base 22, for seizing the data storage device 3 between the vertical surface and the vertical plate 23. The vertical plate 23 is also formed with at least a positioning pin 231 to pass through at least a screw hole 31 of the data storage device 3 and hold the data storage device 3 in place by the pin 231 of the vertical plate 23 and the pin 211 of the vertical surface 21.

Figure 3:
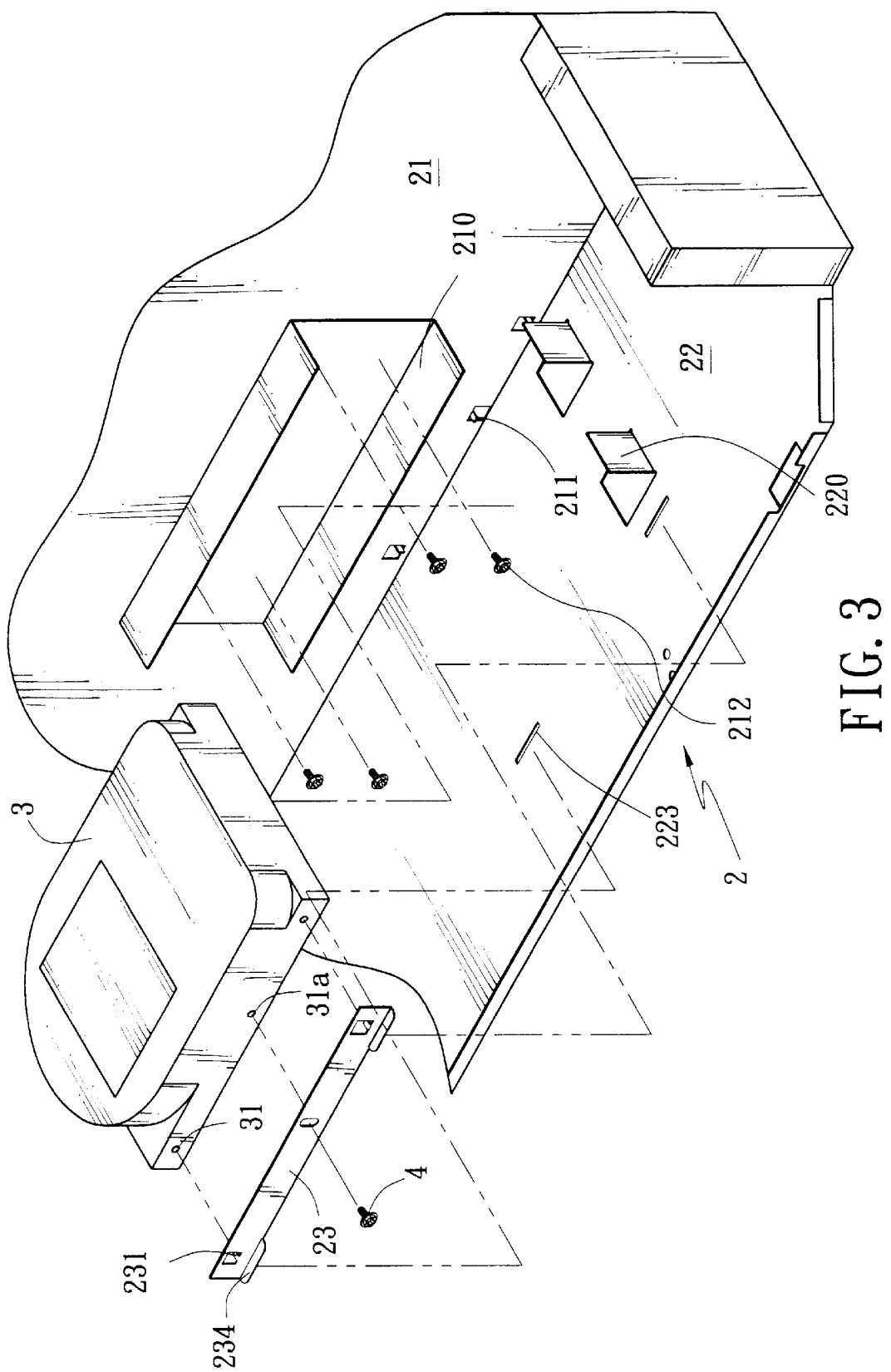
FIG. 3 is an exploded view of a fixing device for a data storage device of computer according to the present invention in which a second embodiment of a folded edge of the vertical surface is shown.

In this embodiment, the vertical surface 21 and the base 22 are made of sheetmetal. Three positioning pins 211 of the vertical surface 21 are cut and bent from the sheetmetal. The positioning pins 211 bend toward the space 2 to be inserted into screw holes 31 of the data storage device 3. A folded edge 210 formed from the vertical surface 21 is used to vertically position the data storage device 3 between the base 22 and the folded edge 210. The folded edge 210 can be directly cut and bent from sheetmetal of the vertical surface 21 as shown in FIG. 1, or can be a separated member attached and fixed by screws 212 or other fasteners to the vertical surface 21 as shown in FIG. 3. At least a positioning plate 220 (two are shown in FIG. 1) perpendicular to the base 22 and the vertical surface 21 can also be formed on the base 22, as shown in FIG. 1, for positioning the horizontal position of the data storage device 3, so that the positioning pins 211 can be easily inserted into holes on the data storage device 3 when the data storage device 3 is put into place.

Figure 2B:
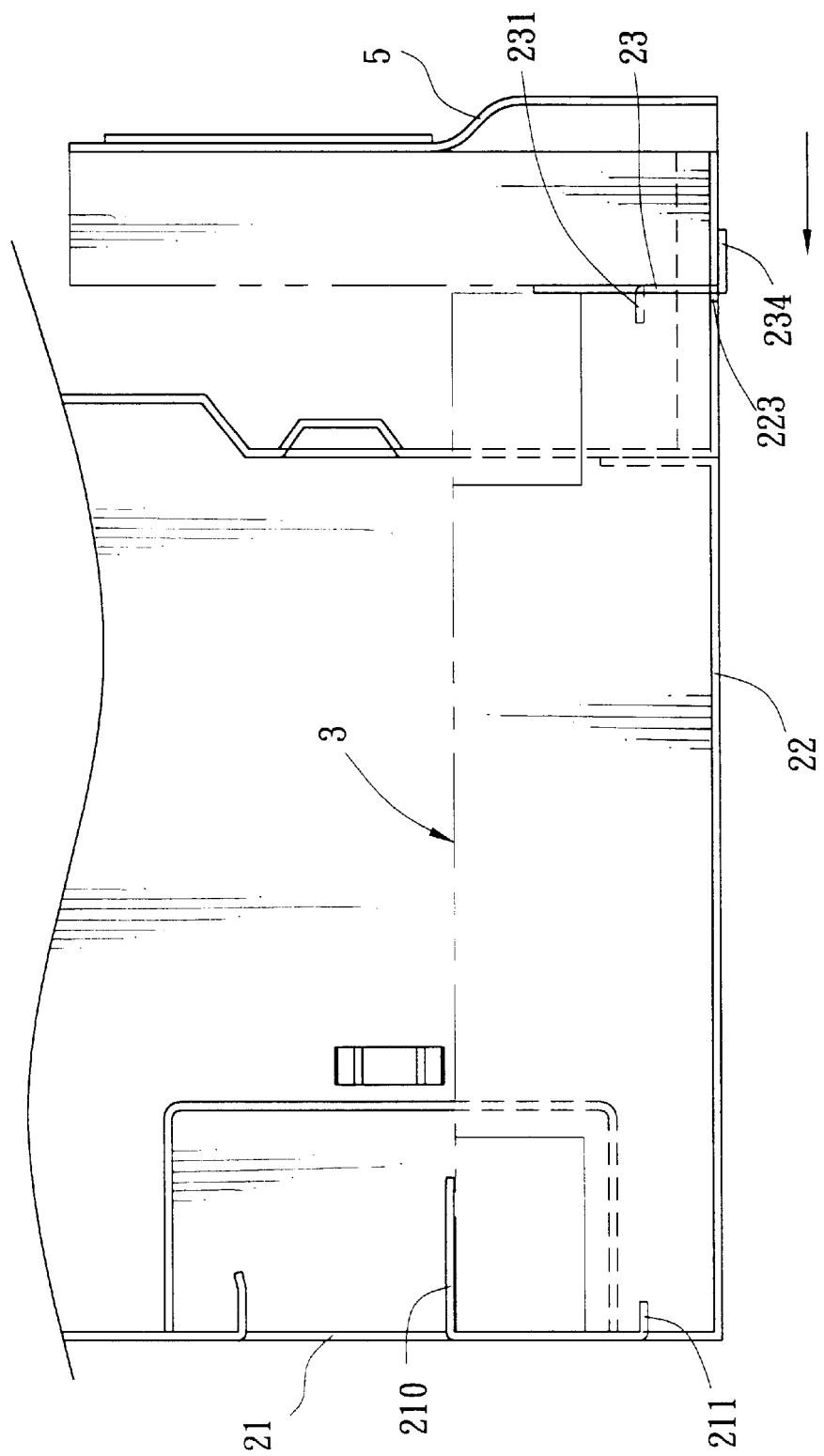
FIG. 2B is further a sectional view of the structure of FIG. 1, showing the vertical plate being fixed to the data storage device.

At least a position pin 231 (two are shown in FIG. 1) is also formed on the vertical plate 23 and made of the sheetmetal directly. The fixing structure of the vertical plate 23 to the base 22 is preferably as shown in the drawings that at least a slot 223 is formed on the base 22, and a inserting portion 234 is bent from the vertical plate 23 in the direction departing from the data storage device 3. The inserting portion 234 can fit into the slot 223 when the vertical plate 23 is inclined in an angle as shown in FIG. 2A. After insertion, the vertical plate 23 is turned vertically to hold the side of the data storage device 3 and fit the positioning pins 231 into screw holes 31 of the data storage device 3. A screw 4 can further be used on the vertical plate 23 to fasten the data storage device 3 through another screw hole 31a. Or, the vertical plate 23 and the data storage device 3 can be pressed and fixed by a computer case 5 or another adjacent element as shown in FIG. 2B, thereby the screw 4 can be omitted.

In conclusion, the fixing device for a data storage device of computer according to the present invention has at least the following advantages:

1) besides the base and vertical surface of the computer case, only a vertical plate and a screw (or even no screw) is needed for fastening the data storage device, therefore, it saves the components and cost; and 2) it is easy to assemble and disassemble, and convenient for the manufacturer and the users.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for fixing a data storage device of a computer such as hard disk or CD-ROM drive, comprising:

a vertical surface, located aside a space for the data storage device, having at least a positioning pin formed thereon;

a base, horizontally extended from the vertical surface, for carrying the data storage device; and a vertical plate, parallel to the vertical surface and fixed on the base, for seizing the data storage device between the vertical surface and the vertical plate, the vertical plate is also at least formed a positioning pin to pass through a screw hole of the data storage device and hold the data storage device in place by the pin of the vertical plate and the pin of the vertical surface, the vertical plate having at least an inserting portion to be fitted with the base, the inserting portion being bent into a direction departing from the data storage device, wherein the vertical surface is further formed with a folded edge parallel to the base and capable of vertically holding the data storage device in place, and wherein the folded edge is a separated component fixed by screws to the vertical surface.

2. The device for fixing a data storage device of a computer as recited in claim 1, wherein the vertical surface and the base are made from sheetmetal, the positioning pin on the vertical surface is also cut and bent from the sheetmetal.

3. The device for fixing a data storage device of a computer as recited in claim 1, wherein the positioning pins on the vertical surface and the vertical plate are capable of being fitted into screw holes formed on the data storage device.

4. The device for fixing a data storage device of a computer as recited in claim 1, wherein the vertical plate is further formed with a hole for a screw to fix the vertical plate to the data storage device.

5. The device for fixing a data storage device of a computer as recited in claim 1, wherein the positioning pins on the vertical plate is cut and bent from the sheetmetal.

6. The device for fixing a data storage device of a computer as recited in claim 1, wherein the folded edge is cut and bent from the vertical surface.

7. The device for fixing a data storage device of a computer as recited in claim 1, wherein the base is further formed with at least a positioning plate perpendicular to the base and capable of horizontally guiding the data storage device in place to fit the data storage device to the positioning pin of the vertical surface.

8. The device for fixing a data storage device of a computer as recited in claim 1, wherein the base is formed with at least a slot for fitting the inserting portion of the vertical plate.

9. A device for fixing a data storage device of a computer such as hard disk or CD-ROM drive, comprising:

a vertical surface, located aside a space for the data storage device, having at least a positioning pin formed thereon;

a base, horizontally extended from the vertical surface, for carrying the data storage device; and a vertical plate, parallel to the vertical surface and fixed on the base, for seizing the data storage device between the vertical surface and the vertical plate, the vertical plate is also at least formed a positioning pin to pass through a screw hole of the data storage device and hold the data storage device in place by the pin of the vertical plate and the pin of the vertical surface, the vertical surface being formed with a folded edge parallel to the base for vertically holding the data storage device in place, the folded edge being a separated component fixed to the vertical surface, wherein the folded edge is fixed by screws to the vertical surface.

10. The device for fixing a data storage device of a computer as recited in claim 9, wherein the vertical surface and the base are made from sheetmetal, the positioning pin on the vertical surface is also cut and bent from the sheetmetal.

11. The device for fixing a data storage device of a computer as recited in claim 9, wherein the positioning pins on the vertical surface and the vertical plate are capable of being fitted into screw holes formed on the data storage device.

12. The device for fixing a data storage device of a computer as recited in claim 9, wherein the vertical plate is further formed with a hole for a screw to fix the vertical plate to the data storage device.

13. The device for fixing a data storage device of a computer as recited in claim 9, wherein the positioning pins on the vertical plate is cut and bent from the sheetmetal.

14. The device for fixing a data storage device of a computer as recited in claim 9, wherein the base is further formed with at least a positioning plate perpendicular to the base and capable of horizontally guiding the data storage device in place to fit the data storage device to the positioning pin of the vertical surface.

15. The device for fixing a data storage device of a computer as recited in claim 9, wherein the vertical plate is further formed with at least an inserting portion to be fitted with the base, and wherein the inserting portion on the vertical plate is bent into a direction departing from the data storage device.

16. The device for fixing a data storage device of a computer as recited in claim 9, wherein the vertical plate is further formed with at least an inserting portion to be fitted with the base, and wherein the base is formed with at least a slot for fitting the inserting portion of the vertical plate.

* * * * *